June 8, 1954 LE ROY D. KILEY 2,680,803
ILLUMINATING MEANS FOR THERMOSTATS
Filed Aug. 1, 1949

INVENTOR.
LEROY D. KILEY
BY *Robert F. Peck*

ATTORNEY

Patented June 8, 1954

2,680,803

UNITED STATES PATENT OFFICE 2,680,803

ILLUMINATING MEANS FOR THERMOSTATS

Le Roy D. Kiley, Glen Arm, Md., assignor to Bendix Aviation Corporation, Baltimore, Md., a corporation of Delaware Application August 1, 1949, Serial No. 107,951

3 Claims. (Cl. 240—2.1)

This invention relates to improvements in thermostats and particularly to a novel means of illumination for a thermostat.

Conventional thermostats used in connection with domestic heating installations are provided with some arrangement for setting the temperature to which the thermostat responds. However, to observe the setting it is necessary for one to be quite close to the thermostat, as the setting indicia are normally not large enough to permit reading of same by one in a position remote to the thermostat. In a great many installations, the thermostat is installed in a room frequently occupied and it would be quite convenient for occupants of the room to be able to detect the setting of the thermostat from any position in the room, without having to change their position.

Accordingly, it is an object of the present invention to provide novel means for indicating the setting position of a thermostat in such a way that the setting is visible and determinable from a position remote from the thermostat.

The above-stated object is carried out by means of a dial knob mounted on the thermostat housing for setting the position of the thermostat. The dial knob is provided with a light-transmitting area corresponding to the normal setting of the thermostat and within the housing is mounted a light source in proximity to the light-transmitting area whereby an illuminated area serves to indicate the setting of the thermostat. The light-transmitting area is normally positioned adjacent the 70-degree F. scale marking on the knob so that any temperature setting of the knob below or above 70 degrees F. can be readily perceived.

An additional feature of the invention provides for illumination of a thermometer mounted on the thermostat housing, the illumination being provided from the same source of light used for illuminating the dial knob.

The invention will be more fully understood by reference to the drawings annexed hereto, when taken in conjunction with the detailed description below.

Figure 1:
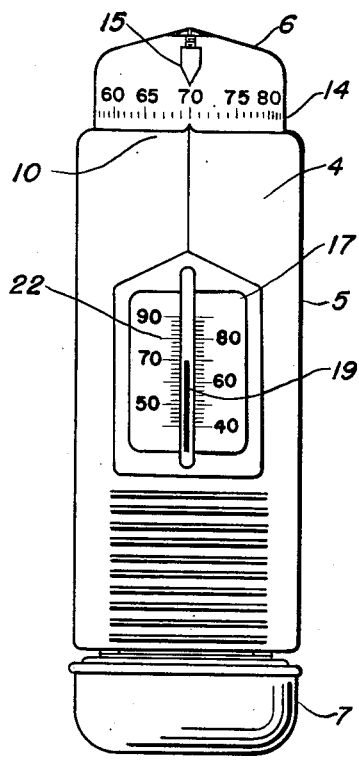
Figure 2:
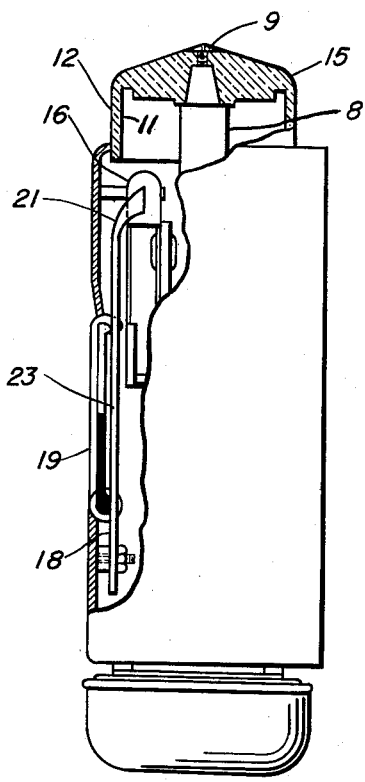
Figure 3:
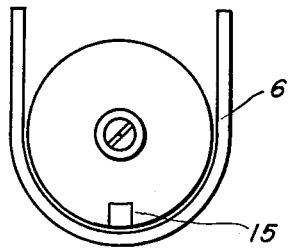

In the drawings, Fig. 1 is a front elevation view of a thermostat constructed in accordance with the present invention; Fig. 2 is a side view of the thermostat shown in Fig. 1, the view being partly in elevation and partly in section; Fig. 3 is a top view of the dial knob shown in Figs. 1 and 2.

Referring to the drawings, there is shown a thermostat 4 comprising a housing 5 having a dial knob 6 mounted on its upper end and a temperature responsive unit 7 mounted on its lower end.

The thermostat 4 can be of conventional design embodying a suitable temperature responsive element of the expanding fluid type adapted to actuate an electric switch by means of a suitable mechanical linkage. The details of the temperature responsive element, switch, and linkage form no part of the present invention and are not shown on the drawings for reasons of simplicity and brevity. Suffice to say that the dial knob 6 is rigidly secured to a member 8 by means of screw 9, the member 8 being connected to the aforesaid mechanical linkage system in such a manner as to permit the electric switch to be actuated through a selected range of temperatures. The member 8 is adapted for rotation so that rotation of the dial-knob 6 will serve to vary the setting of the thermostat 4 through a selected range of temperatures. The setting of the thermostat is determined by the position of the knob 6 with respect to the fixed reference point 10 on the housing 5.

The dial-knob 6 is shown as being of a substantially hollow cylindrical configuration and is normally constructed of a light-transmitting material such as glass or one of the transparent plastic materials commercially available. However, it could be of any substance suitable for such use. As shown in Fig. 2, the dial-knob 6 has substantially vertical inner and outer surfaces 11 and 12, respectively. Either of these surfaces can be provided with suitable scale indicia, as indicated at 14 in Fig. 1. One method of providing the scale indicia 14, in the case of a knob constructed of a transparent plastic material, would be to coat the inner surface 11 with a substantially opaque coating material after having masked the outer surface 12 corresponding to temperature scale markings and graduations. Similarly, the inner surface 11 could be masked to correspond to the arrow-shaped area 15. Another method of providing the indicia 14 would be to punch out same on a flexible strip and then insert the strip within the knob 6 by bending said strip around the inner surface 11, an annular recess 15' being provided to retain the strip in place. Whatever technique is used, the end result comprises a knob 6 presenting a substantially opaque surface except for the scale indicia 14 and arrow-shaped area 15, the indicia and area being capable of transmitting light from within the knob 6.

Mounted within the housing 5 is a light bulb 16 suitably connected to an external source of electric energy. The bulb 16 is mounted in close proximity to the hollow interior of knob 6 whereby a substantial portion of its light can be transmitted from within the knob 6 through the indicia 14 and area 15 to the outside. It is to be noted that the bulb 16 is mounted in the upper end of housing 5 at a point relatively remote from the temperature responsive unit 7. Such a construction serves to eliminate any errors resulting from the effects on temperature responsive unit 7 of the heat generated by bulb 16.

The housing 5 has an opening 17 in its front face. Mounted within the housing 5 so as to cover the opening 17 is a member 18 to which is affixed a thermometer 19. The member 18 is made of a suitable light-transmitting plastic material and has an end 21 extending to a point in close proximity to bulb 16. The member 18 is provided with suitable temperature scale indicia 22 to cooperate with thermometer 19 to give a visual indication of temperature. The member 18 is so formed and positioned as to have rays of light enter the end 21 and pass down through the member 18 in a manner well known in the art. If the indicia 22 are formed by engraving or recessing same on the inner surface 23 of member 18, in a manner well known in the art, the light transmitted through member 18 will be reflected outwardly by the indicia 22, thereby causing the indicia to stand out in substantially bold relief on the member 18.

With the arrangement described above, it is clear that the arrow-shaped area 15, the indicia 14, and the indicia 22 will be illuminated and will serve to indicate the setting of the thermostat and the ambient temperature. By locating the arrow-shaped area 15 in proximity to the 70-degree F. marking on knob 6, any one can determine the setting of the thermostat by merely glancing at area 15. If this area is properly dimensioned, it is rendered visible from any point within a normal-sized room. In view of the fact that most domestic heating units are set to maintain 70 degrees F. room temperature, the area 15 has been conveniently positioned in proximity to the 70 degree F. scale marking on knob 6. However, the area 15 could be positioned to correspond to some other temperature, as 68 degrees F., 72 degrees F., etc. If the knob 6 is turned to the right or left, away from its normal position, the position of the area 15, with respect to the fixed point 10 on housing 5, will readily indicate whether the thermostat is set above or below the normal setting position, and this can be determined by merely glancing at the thermostat from any position within the line of sight of the observer. Obviously, various color combinations can be worked out by proper choice of materials or coating compositions to make the area 15 readily stand-out for ease of observation of its position. Further, the area 15 and the indicia 14 and 22 could be formed by punching out the knob 6 and the member 18 so as to allow the transmission of light therethrough. Also various combinations of colors and the proper choice of materials can be utilized to make the indicia 14 and 22 readily stand-out for ease of observation.

What is claimed and desired to be secured by United States Letters Patent is:

1. An illuminated thermostat, comprising: a housing, a dial knob mounted on said housing and movable with respect to a relatively fixed point on the housing for setting said thermostat, said dial knob carrying indicia representing a temperature scale which cooperates with said fixed point to indicate the actual setting of the thermostat and said dial knob also having delineated thereon a pointer or analogous configuration which is located adjacent a preselected temperature indicating character and which also cooperates with said fixed point to give a visual indication of what the setting should be to obtain a given normal temperature condition, said temperature scale and said pointer and at least that portion of the knob in the immediate region of the scale and pointer having contrasting light-transmitting properties to enhance the visibility of the scale and pointer at a distance remote from the thermostat, said housing having an opening in one side thereof, a member formed of light-transmitting material mounted on said housing in proximity to said opening, a thermometer mounted on said member, and a light source common to said dial knob and said member located within said housing immediately beneath said dial knob.

2. The combination defined in claim 1 wherein a temperature sensing element is mounted on said housing at the bottom thereof so as to be remote from said light source.

3. An illuminated thermostat, comprising: a housing, a hollow dial knob mounted on said housing and rotatable with respect to a relatively fixed point on the housing for setting said thermostat, said dial knob carrying indicia representing a temperature scale which cooperates with said fixed point to indicate the actual setting of the thermostat and said dial knob also having delineated thereon a pointer or analogous configuration which is located adjacent a preselected temperature indicating character and which also cooperates with said fixed point to give a visual indication of what the setting should be to obtain a given normal temperature condition, said temperature scale and said pointer and at least that portion of the knob in the immediate region of the scale and pointer being formed of material having contrasting light-transmitting properties to enhance the visibility of the scale and pointer at a distance remote from the thermostat, said housing having an opening in one side thereof, a member formed of light-transmitting material mounted on said housing in proximity to said opening and having temperature scale indicia thereon, a thermometer mounted on said member, and a light source common to said dial knob and said member located within said housing in the proximity of said dial knob.

References Cited in the file of this patent

UNITED STATES PATENTS

| Number | Name | Date |
|---|---|---|
| 1,645,211 | Zeal | Oct. 11, 1927 |
| 2,097,625 | Langlotz | Nov. 2, 1937 |
| 2,200,801 | Money | May 14, 1940 |
| 2,254,134 | Berry | Aug. 26, 1941 |
| 2,309,060 | Glaser | Jan. 19, 1943 |
| 2,328,485 | Ott | Aug. 31, 1943 |
| 2,333,492 | Ridge | Nov. 2, 1943 |
| 2,472,638 | White | June 7, 1949 |
| 2,548,760 | Allgeyer | Apr. 10, 1951 |
| 2,566,026 | Hughes, Jr. | Aug. 28, 1951 |

FOREIGN PATENTS

| Number | Country | Date |
|---|---|---|
| 845,909 | France | May 22, 1939 |
| 584,163 | Great Britain | Jan. 8, 1947 |